(12) United States Patent
Schlensker et al.

(10) Patent No.: US 6,588,443 B2
(45) Date of Patent: Jul. 8, 2003

(54) METHOD OF DRAINING CONDENSATE AND CONDENSATE DRAIN DEVICE

(75) Inventors: Herbert Schlensker, Leverkusen (DE); Berthold Koch, Neuss (DE)

(73) Assignee: Beko Technologies GmbH (DE)

( * ) Notice: Subject to any disclaimer, the term of this patent is extended or adjusted under 35 U.S.C. 154(b) by 0 days.

(21) Appl. No.: 10/172,237

(22) Filed: Jun. 14, 2002

(65) Prior Publication Data
US 2002/0157705 A1 Oct. 31, 2002

Related U.S. Application Data

(63) Continuation of application No. PCT/DE00/04435, filed on Dec. 13, 2000.

(30) Foreign Application Priority Data

Dec. 17, 1999 (DE) .......................... 199 60 937

(51) Int. Cl.⁷ ................................. G05D 9/12
(52) U.S. Cl. ..................... 137/2; 137/178; 137/187; 415/169.2
(58) Field of Search .................. 137/2, 178, 187; 415/169.2

(56) References Cited

U.S. PATENT DOCUMENTS 4,974,626 A * 12/1990 Koch ....................... 137/187
5,080,126 A * 1/1992 De Rycke et al. .......... 137/209
6,276,894 B1 * 8/2001 Koch ........................ 137/187

FOREIGN PATENT DOCUMENTS

JP 6-272668 A 9/1994

* cited by examiner

Primary Examiner—Gerald A. Michalsky
(74) Attorney, Agent, or Firm—Akerman Senterfitt

(57) ABSTRACT

The invention relates to a method of draining condensate from a reservoir that communicates with a trap via a drain pipe. The reservoir is subjected to a gas pressure p(reservoir) that can be below atmospheric pressure p(air) or above atmospheric pressure p(air). The method involves the following steps:

Figure 1:
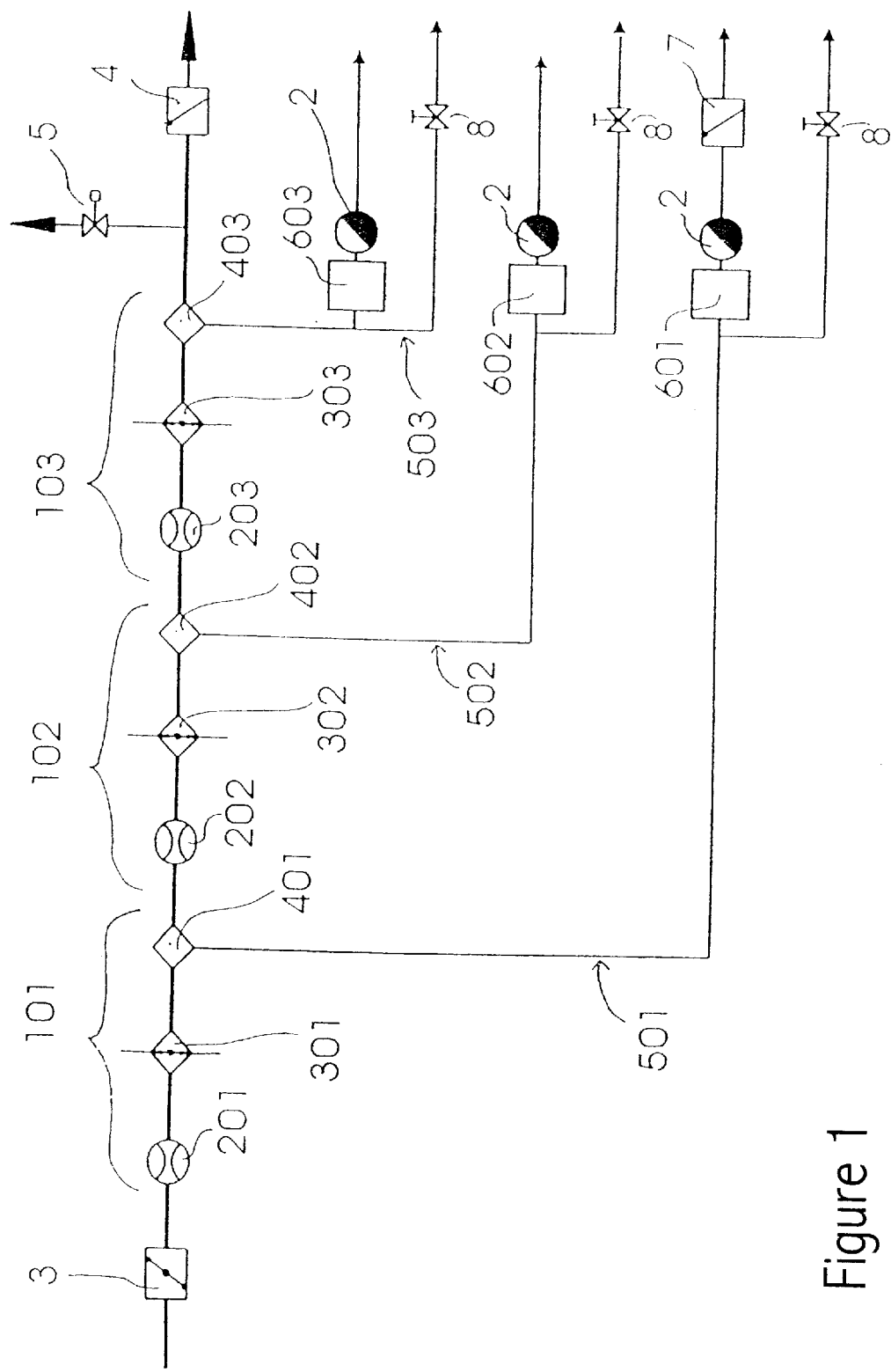

a) collecting condensate in the reservoir, b) acquiring the fill level by means of a level meter, c) providing a control pressure p(control) which, in any operating conditions of the compressed gas system, is above the pressure p(reservoir) in the reservoir and above atmospheric pressure p(air), d) providing, under control, a control conduit input of an exhaust valve, which is assigned to the reservoir and is intended to drain the condensate collected in the reservoir, with a pressure p(input).

15 Claims, 3 Drawing Sheets

METHOD OF DRAINING CONDENSATE AND CONDENSATE DRAIN DEVICE

This application is a continuation of international application number PCT/DE00/04435, filed Dec. 13, 2000.

The subject matter of the present invention is a method of draining condensate from a reservoir of a compressed air or compressed gas system that can be subjected to a pressure above atmospheric, to a subatmospheric pressure or to atmospheric pressure depending on the operating condition of the compressed air or compressed gas system and a device for carrying out this method.

The method of the invention and the device of the invention are more particularly provided for the purpose of draining condensate from a reservoir of a multistage air or gas compressor, which will be termed gas compressor hereinafter. The method of the invention and the device of the invention will be explained hereinafter in the light of their application on multistage gas compressors.

Depending on the operating conditions compressed gas compressors always take in a certain quantity of water vapor that partially condenses after the compression process. This happens to a greater extent when an aftercooler is arranged downstream of a gas compressor, the higher temperatures in the compressed gas resulting from the compression process, which typically may amount to more than 100° C., being reduced to technically sensible values in said aftercooler.

In a multistage gas compressor, compression is carried out step-by-step in compressor stages connected in series. Each compressor stage is hereby typically provided with a compressor unit of its own, an aftercooler and a trap arranged downstream thereof. The condensate produced in aftercooling is separated from the compressed gas stream and is led out of the gas compressor. The pressure of the compressed gas or gravitation generally cause thereby the condensate to be discharged via a drain pipe into a reservoir of any configuration. Said reservoir is thereby either a component part of the gas system or a component part of a condensate drain device by means of which the collected condensate is eventually discharged from the gas compressor.

On account of the particular operating conditions that may occur in multistage gas compressors, the use of previously known condensate drain devices with a pilot operated diaphragm valve for draining collected condensate from a reservoir as they have been described in EP 391 250 for example is possible to a limited extent only. The reason therefore is that, on account of the operating conditions of a gas compressor, both excess pressure and negative pressure as well as atmospheric pressure can prevail.

The use of condensate drain devices with float actuated exhaust valves is not advantageous because they are prone to dirt and grime, dirt and grime being inevitable in compressed gas plants.

For reasons of economy, it does not make any sense to operate a multistage gas compressor at full output power against atmospheric pressure when no compressed gas is demanded by a consumer. Generally, it does not make sense either to switch off the multistage compressor since each process of switching off and of starting implies increased wear of the motor and the compressor. Therefore, in case the demand for compressed gas is reduced, the compressor is often set to idle in such a manner that a sealing device locks the intake side of the first compressor except for a small opening cross-section while an exhaust device located on the pressure side of the last compressor stage is concurrently opened. The exhaust device can be connected to the intake side of the first compressor. A locking device provided on the pressure side of the last compressor prevents the already produced compressed gas from flowing back into the compressor. This arrangement permits the multistage compressor to continue to run without load at low pressure at idle, which considerably saves energy. Increased wear, as it is caused by frequent switching off and on can thus be avoided.

If the compressor is set to the idle condition described, the compressor continues to run without load at low pressure. But a small quantity of compressed gas is delivered, a certain pressure ratio between the various compressor stages being maintained as a result thereof. If the multistage compressor is in this state of control for a longer period of time, pressures below the pressure in the intake gas, more specifically below atmospheric pressure, may develop in the first compressor stages.

If no compressed gas is needed for an extended period of time, the whole multistage compressor can be switched off in order to save the energy still needed for operating at idle. Once all of the compressor units have been stopped, the compressor unit is generally vented with atmospheric pressure via an exhaust device on the pressure side of the last compressor stage. In this case, atmospheric pressure prevails in all the parts of the multistage compressor.

As a result thereof, different operating conditions can occur in a reservoir in which condensate produced in a trap of a compressor unit is collected. At normal operation of the multistage compressor, all of the reservoirs that are arranged on the pressure side of a respective one of the compressors are subjected to pressures above the pressure of the intake gas, more specifically above atmospheric. In this case, collected condensate could be discharged from all the reservoirs by means of condensate drain devices built according to previously known design principles. Drainage thereby is performed either driven by the excess pressure relative to atmospheric pressure prevailing in the compressor stage and/or by gravitation.

The same applies when the multistage compressor is completely turned off. In this case, all of the reservoirs are subjected to atmospheric pressure so that the condensate can be drained by gravitation from all the reservoirs without any problem. In this case too, prior art condensate drain devices can readily be utilized inasmuch as a certain excess pressure is not needed for opening.

As already described herein above though, in the described idle condition when less compressed gas is demanded, some compressor stages located in proximity to the gas intake (i.e., low compressor stages) may be subjected to pressures below the intake pressure, more specifically below atmospheric. In this case, the condensate produced in a trap of such compressor stages is drained into a reservoir, the collected condensate with the gas space located there above being however subjected to a pressure below the initial pressure, more specifically below atmospheric.

In using a condensate drain device as disclosed in EP 391 250 for draining the condensate the problem is that, due to their design, these condensate drain devices open their exhaust valve when a negative pressure develops in the reservoir and the pressure difference between reservoir and exhaust side of the condensate drain device, which is subjected i.a. to atmospheric pressure, reaches a certain value. The negative pressure in the reservoir and in the compressor stage causes ambient air to be drawn into the amplifier stage and condensate may be simultaneously entrained. Various compressor units may thus be vented on their exhaust side, which is not desired, and concurrently slurried with condensate, which may damage the compressor units. This is the reason why the condensate must in any case be prevented from being discharged from a reservoir which is subjected to a pressure below atmospheric.

The same applies when trying to drain the collected condensate from the reservoir subjected to negative pressure under the influence of gravity by means of a conventional condensate drain device.

In principle, it is possible to discharge collected condensate from the reservoirs of a multistage compressor by means of conventional condensate drain devices, by those described in EP 391 250 for example. Additional safety measures must thereby be taken in order to prevent drainage against atmospheric pressure when a reservoir is subjected to negative pressure. For this purpose, a check valve is often arranged behind the condensate drain device, said check valve reliably preventing the condensate drain device from undesirably opening and ambient air from penetrating into the reservoir subjected to negative pressure.

When the multistage compressor is turned off, the reservoir is subjected to atmospheric pressure. In using previously known condensate drain devices with a pilot operated diaphragm valve according to EP 391 250 for example for draining the condensate, the problem is that the pilot operated diaphragm valves used for drainage require a certain excess pressure in the reservoir relative to the pressure on the exhaust side, that is to say i.a. atmospheric pressure. As a result thereof, when the gas compressor is turned off, it is no longer possible to drain condensate. This however represents a risk since certain quantities of condensate may still be produced even when the plant is at standstill, at least immediately after having turned it off.

It is therefore the object of the present invention to indicate a method that permits to drain condensate from a reservoir that is subjected, in function of the operating condition of the compressed gas system assigned thereto, to an excess pressure, a negative pressure or atmospheric pressure. Operating conditions in which ambient air may penetrate, possibly mixed with condensate, through the reservoir into the compressed gas plant, must reliably be prevented.

It is another object of the invention to indicate a method that permits condensate to be discharged from a multistage compressor at load operation and when said compressor is switched to an off condition, said method being suited to be developed in an simple manner so that drainage is also possible in such operating conditions of the compressor in which the reservoir is subjected to a negative pressure.

It is eventually also an object of the present invention to indicate a condensate drain device for carrying out said method.

It is more specifically an object of the invention to indicate a condensate drain device for a multistage compressor that permits at load operation and when said compressor is switched to an off condition to reliably drain the condensate generated and to reliably prevent, in the idle mode, ambient air from being taken in, possibly mixed with condensate, on the pressure side of a compressor unit. Preferably, this is to be realized with the least possible expenditure in switching technique. Furthermore, a condensate drain device in accordance with the invention is to be developed in such a manner that the condensate can be reliably drained even in case the multistage compressor operates at idle.

The method of the invention can be used with any compressed gas system in which condensate is generated that is collected in a reservoir for condensate, said reservoir being subjected to an excess pressure, a negative pressure or atmospheric pressure depending on the operating condition of the compressed gas system.

The method involves the following steps:
a) collecting condensate in the reservoir,
b) acquiring the fill level of condensate in the reservoir by means of a level meter and an electronics unit arranged downstream thereof,
c) providing a control pressure p(control) which, in any operating conditions of the compressed gas system, is above the pressure p(reservoir) in the reservoir and above atmospheric pressure p(air),
d) providing, under the control of the electronics unit (26), a control conduit input (241) of an exhaust valve (24) which is assigned to the reservoir (601) and is intended to drain the condensate collected in the reservoir (601) with a pressure p(input)

the pressure p(input)
  i) substantially corresponding to the control pressure p(control) when the maximum fill level in the reservoir has not yet been reached or exceeded,
  ii) substantially corresponding to the atmospheric pressure p(air) when the maximum fill level in the reservoir is reached or exceeded, and wherein the position of the exhaust valve is controlled by the pressure p(reservoir) in the reservoir, the pressure p(input) at the control conduit input, the pressure on the exhaust side of the exhaust valve, which more specifically can be atmospheric pressure p(air), and by a threshold value P, more specifically wherein the exhaust valve for draining the condensate
  iii) is closed when the pressure p(input) is above the pressure p(reservoir) in the reservoir plus the threshold value P and
  iv) is opened when the pressure p(input) is below the pressure p(reservoir) in the reservoir plus the threshold value P.

More specifically, the method may be used with any multistage compressor being provided with several compressor stages connected in series, more specifically with at least two such stages. At least the compressor unit that operates at lower pressures must be provided with a trap.

The method is particularly suited for use with a multistage compressor for compressing a gas, e.g., air, that is provided with compressor stages connected in series, each of the stages being comprised of one compressor unit n with an aftercooler and a trap, both of which are arranged downstream of said compressor unit. The condensate generated in the trap is drained via a drain pipe for example into a reservoir of any design. The gas pressure p(reservoir) prevailing in the gas space located above the condensate in the reservoir substantially corresponds to the gas pressure p(i) prevailing on the exhaust side of the corresponding $i^{th}$ compressor stage. In this case, the method advantageously uses as a control pressure p(control) substantially the gas pressure p(j) on the exhaust side of the compressor stage j. When the multistage compressor is in operation, the $j^{th}$ compressor stage reaches a higher gas pressure p(j) than the $i^{th}$ compressor stage which reaches, on the exhaust side, the gas pressure p(i).

In selecting the appropriate threshold value P it can be made certain that, in all the operating conditions of the compressed gas system, condensate is only discharged from the reservoir when the fill level of the condensate in the reservoir has reached or exceeded a maximum value and when the reservoir is not subjected to a negative pressure relative to the exhaust side of the exhaust valve i.e., i.a. atmospheric pressure.

The threshold value P is preferably selected in such a manner that in any operating conditions (at load, at idle) of the compressed gas system the following applies:

a) $p(\text{reservoir}) + P < p(\text{input})$ when $p(\text{input}) = p(\text{control})$, [$p(\text{control})$ being $> p(\text{air})$], b)
  i) $p(\text{reservoir}) + P > p(\text{input})$, when $p(\text{input}) = p(\text{air})$ and $p(\text{reservoir}) \geqq p(\text{air})$, more specifically $p(\text{reservoir}) = p(\text{excess})$
  ii) $p(\text{reservoir}) + P < p(\text{input})$ when $p(\text{input}) = p(\text{air})$ and $p(\text{reservoir}) = p(\text{negative})$, preferably $p(\text{reservoir}) < p(\text{air})$ The characters indicating a relationship mean "substantially correspond to". Furthermore, when the threshold value P is predetermined by e.g., a spring (as it will be described hereinafter), the control pressure p(control) can also be chosen accordingly.

A device needed for carrying out said method requires but a minimum of electric appliances, as the whole method can be carried out with a condensate drain device operating almost entirely mechanically with compressed gas. Outstanding advantages with regard to reliability and freedom from maintenance of the structure and a large indifference to possible power supply failures derive therefrom.

For carrying out the method of the invention, a condensate drain device provided with the following component parts is suited:

a) a level meter for acquiring the fill level of condensate in the reservoir, more specifically for acquiring the condition in which the maximum fill level in the reservoir has been reached or exceeded, b) a control valve arranged in a control conduit via which a control pressure p(control) is delivered to the condensate drain device, said control pressure being above the pressure in the reservoir p(reservoir) under any operating conditions of the compressed gas plant, i.e., $$p(\text{control}) > p(\text{reservoir}),$$

in any case however above atmospheric pressure p(air), the control valve being provided for controlling the flow of the control pressure p(control) through the control conduit, c) an exhaust valve assigned to the reservoir and provided for discharging condensate from the reservoir, more specifically against atmospheric pressure p(air), the exhaust valve being configured in such a manner that it is provided with a control conduit input which is connected to the control conduit by way of the control valve so that, when the control valve is open, the control pressure p(control) prevails at the input of the control conduit, d) a venting valve which is arranged in the control conduit between control valve and control conduit input and which, when the control valve is closed, vents the control conduit between control valve and control conduit input until it reaches atmospheric pressure p(air), e) an electronics unit that interprets the signal of the level meter and closes the control valve when the maximum fill level in the reservoir has been reached or exceeded, the exhaust valve being provided with the following positions of control:

i) a locking position for condensate when the pressure prevailing at the input of the control conduit p(input) is higher than the pressure prevailing in the reservoir p(reservoir) plus a preset threshold value P, ii) a flow through position for condensate when the pressure prevailing at the input of the control conduit p(input) is lower than the pressure prevailing in the reservoir p(reservoir) plus threshold value P.

In accordance with the method described herein above, the device can be realized in such a manner that, in selecting the proper threshold value P, the condensate drain device of the invention only discharges condensate from the reservoir when the pressure in said reservoir is at least atmospheric p(air) or above p(excess).

Generally, the threshold value P must be adjusted to the pressures developed under diverse operating conditions of the multistage compressor. More specifically, the threshold value P can also be selected in such a manner that the exhaust valve is opened only when at least a slight excess pressure prevails in the reservoir. Actually however, this is not provided for, but may be advantageous or even necessary in certain individual cases.

If the pressure p(negative) in the reservoir is below atmospheric p(air), the drive of the exhaust valve reliably prevents the reservoir from being vented with atmospheric pressure by the condensate drain device of the invention, the corresponding compressor unit being thus reliably prevented from undesirably being vented and more specifically from being slurried with condensate.

More specifically, the condensate drain device in accordance with the invention is configured in such a manner that, irrespective of the fill level of the condensate, the condensate drain device reliably keeps the exhaust valve closed when the pressure in the reservoir is negative.

Even without additional check valve, the valve cannot open automatically because of the difference in pressure between the exhaust side of the exhaust valve and the reservoir. This constitutes a substantial improvement over the previously known condensate drain devices with pilot operated diaphragm valves as they have been disclosed in EP 391 250 for example.

Due to its structure, the exhaust valve cannot be opened either when the reservoir is subjected to a negative pressure. Faulty operation is thus excluded and the compressed gas system is reliably prevented from being slurried with condensate even without a check valve being arranged downstream thereof.

Finally, condensate can also be discharged from the reservoir when said reservoir is subjected to atmospheric pressure. The exhaust valve is designed in such a manner that it automatically opens the passage for condensate when atmospheric pressure prevails in the reservoir and at the input of the control conduit, which is the case when the compressed gas system is at standstill.

For a better understanding it should be noted that, when the pressure p(reservoir) is used as the control pressure p(control) and when the threshold value P is selected accordingly, the condensate drain device of the invention substantially operates like a conventional condensate drain device as disclosed in EP 391 250 for example. The threshold value P is selected such that the exhaust valve only opens when a certain excess pressure p(excess) prevails in the reservoir i.e., the exhaust valve is closed when there is equilibrium pressure between the reservoir, the input of the control conduit and the exhaust side of the exhaust valve. By contrast, with the condensate drain device of the invention, the exhaust valve is open when there is equilibrium pressure between the reservoir, the input of the control conduit and the exhaust side of the exhaust valve.

In developing the condensate drain devices disclosed in EP 391 250 in accordance with the method of the invention in such a manner that a condensate drain device is realized in accordance with the invention, it is made possible to drain condensate by means of a type of a condensate drain device that proved its worth in practical use even in the difficult case of use in which condensate is to be drained from a reservoir that is subjected, depending on the operating condition of the corresponding compressed gas system, to a negative pressure, an excess pressure or to atmospheric pressure. In this advantageous development of the device of the invention, the exhaust valve is configured as a compressed air actuated diaphragm valve. The diaphragm valve is thereby driven by the pressure prevailing at the input of the control conduit p(input), by the pressure in the reservoir p(reservoir), by the pressure on the exhaust side of the exhaust valve, i.e., i.a. atmospheric pressure p(air), and by an additional force K which represents the afore mentioned threshold value P.

This force K can more specifically be realized by means of a spring provided in the exhaust valve. In order to permit adjustment of the threshold value P to the conditions of the compressed gas compressor, the threshold value P is preferably settable at the very exhaust valve. This can be realized in that e.g. either the force of the spring or its bias is variably adjustable.

It is no longer necessary to possibly turn, as an alternative, to condensate drain devices with float actuated exhaust valves which are prone to dirt and wear.

Particular advantages are obtained when the electronics unit, which interprets the signal of the level meter, closes the control valve as soon as the maximum fill level in the reservoir is exceeded and additionally maintains, after closure (i.e., after the maximum fill level has been exceeded), the control valve closed or the exhaust valve open until the reservoir is emptied as completely as possible. Such a control has become known to be provided in the condensate drain devices described in EP 391 250 or DE 196 45 815 so that it needs not be explicitly described here. More specifically, such a control may make use of a second level meter for acquiring a lower fill level and/or a timing circuit. The device of the invention can be connected to all the prior art controls that serve this purpose.

Further advantages and characteristics of the method and the device in accordance with the invention will become apparent in the subordinate claims and in the following description of exemplary embodiments that are explained with reference to the drawings. These embodiments are explained with reference to their practical utilization on a multistage compressor. As a matter of course, all of the embodiments and their developments also apply to the general case of a compressed gas system. These generalizations of the embodiments are explicitly included herein.

Figure 2:
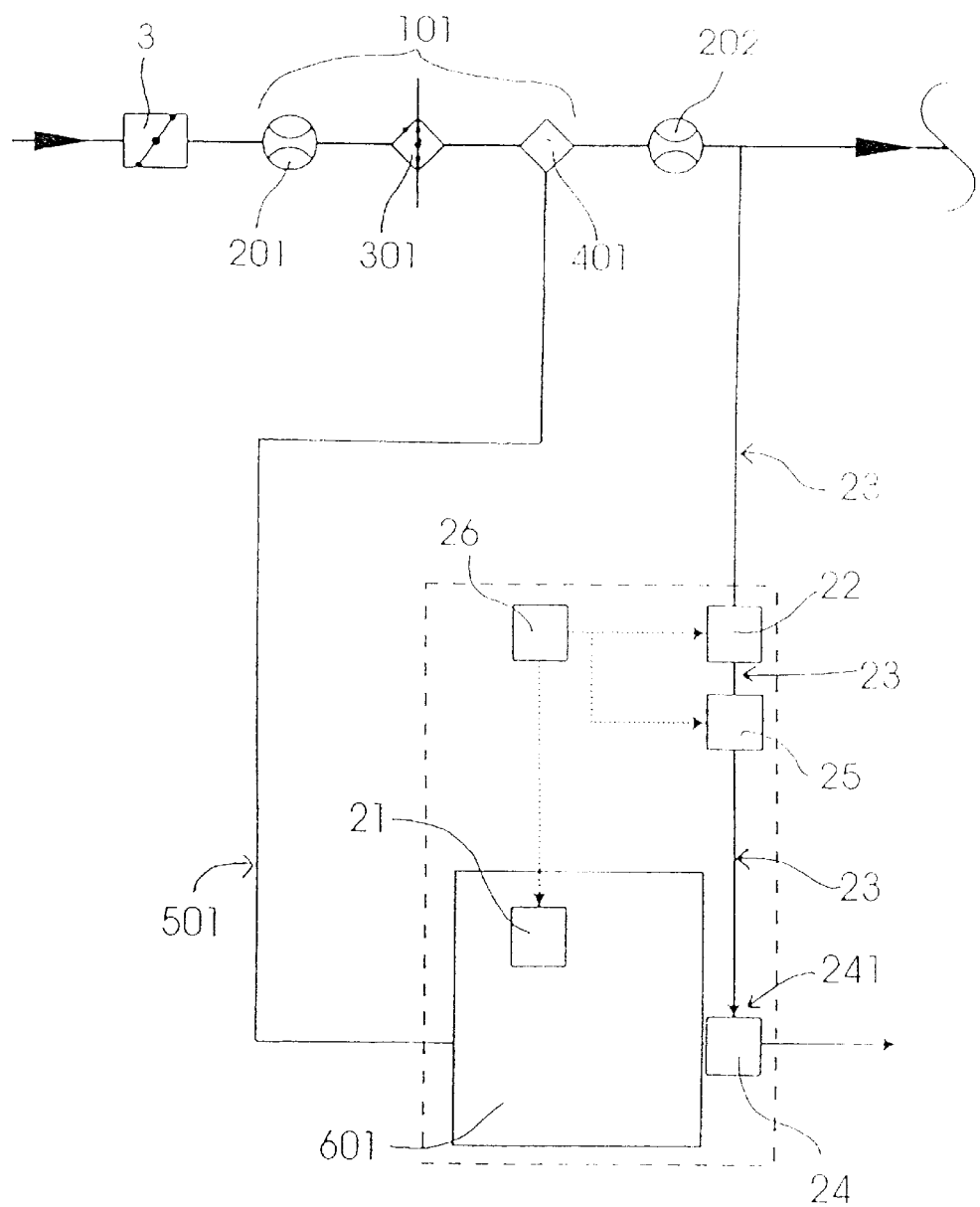
Figure 3:
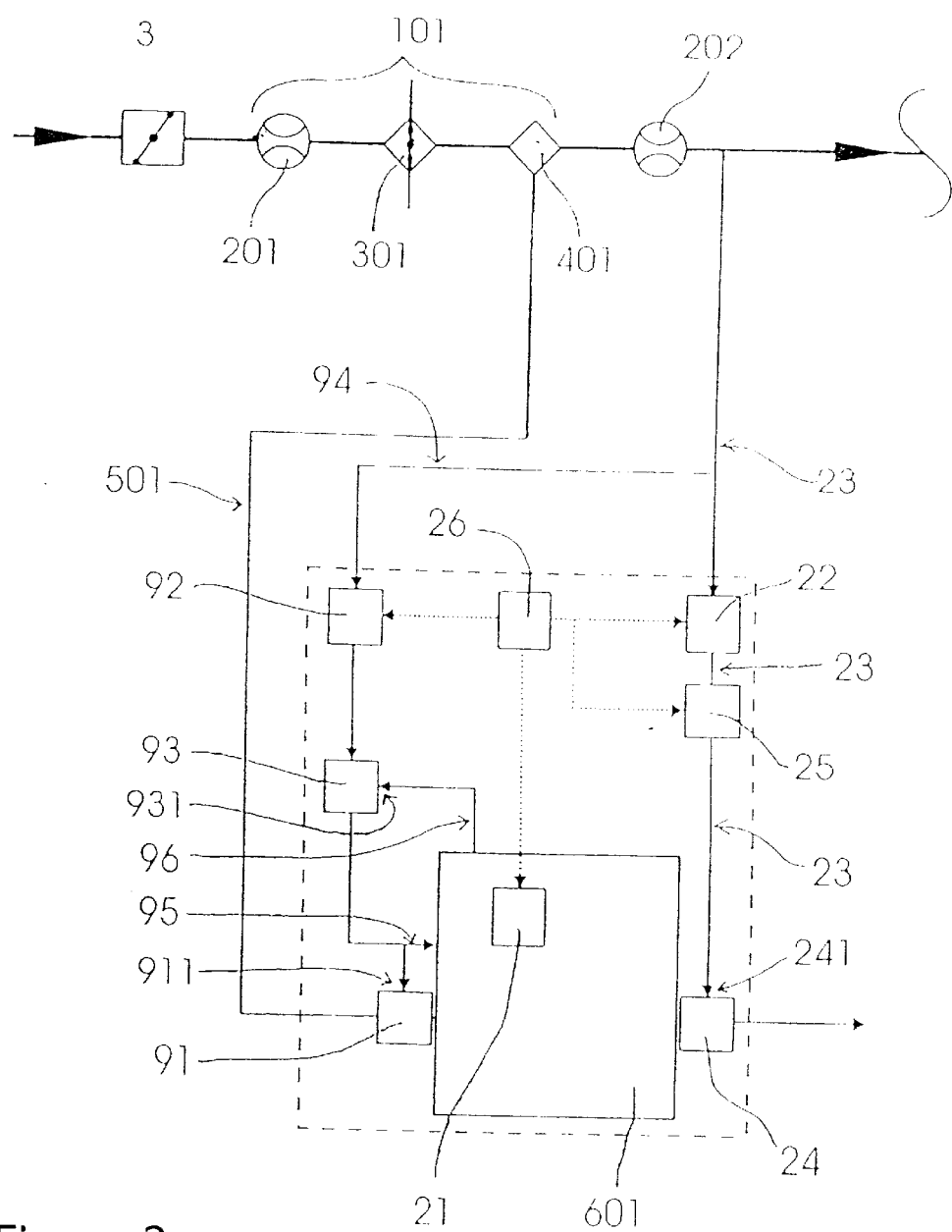

FIG. 1 is a schematic view of a multistage compressor with a reservoir for condensate which may be subjected to a negative pressure and from which collected condensate is discharged by means of a conventional condensate drain device, FIG. 2 is a schematic view of the same multistage compressor, a condensate drain device in accordance with the invention being used for draining the condensate from the reservoir of concern, and FIG. 3 illustrates a development of the condensate drain device of FIG. 2 by means of which drainage is also possible from a reservoir which is subjected to negative pressure.

FIG. 1 illustrates a three-stage gas compressor with state of the art condensate drain devices 6, each compressor stage $1.n$ being provided with a compressor unit $2.n$, an aftercooler $3.n$ and a trap $4.n$. The compressor unit $2.n$ can be a compressor for example and the aftercooler $3.n$ e.g., a liquid cooled heat exchanger. The condensate generated during the cooling process is evacuated in the trap $4.n$. Each compressor stage $1.n$ is provided with a drain pipe $5.n$ that leads to a reservoir $6.n$ from which condensate can be drained by means of a condensate drain device 2. Such a condensate drain device can for example correspond to the condensate drain device 2 disclosed in EP 391 250 and be provided with a reservoir of its own. Accordingly, a reservoir $6.n$, which is assigned to the $n^{th}$ compressor stage, is integrated in the condensate drain device 2 connected to the drain pipe $5.n$. Hand valves 8 are additionally provided in the drain pipes $5.n$ by means of which condensate can be discharged manually from the reservoirs $6.n$ more specifically.

In the case of the first compressor stage 101, a check valve 7 is additionally provided on the exhaust side of the condensate drain device 2.

On the intake side of the first compressor stage 101 there is provided a sealing device by means of which the cross section of the intake side of the first compressor stage can be adjusted. Furthermore, a locking device 4 is provided on the exhaust side of the third compressor stage 103 by means of which the exhaust side of the multistage compressor can be locked. In addition, on the exhaust side of the third compressor stage 103 there is provided, upstream of the locking device 4, a pressure relief 5 by means of which an excess pressure possibly prevailing on the exhaust side of the third compressor stage 103 can be allowed to escape. The exhaust side of the pressure relief 5 is preferably connected to the intake side of the first compressor stage 101.

At normal load of the multistage compressor, the sealing device 3 and the locking device 4 are open and the pressure relief 5 closed. In case the compressor of concern is an air compressor, ambient air is taken in on the intake side of the first compressor stage 101, said ambient air being subjected to atmospheric pressure p(air). A first compression of the intake air is performed in the compressor unit 201 of the first compressor stage, said compression being gradually increased in the compressor unit 202 of the second compressor stage 102 and in the compressor unit 203 of the third compressor unit 103. At load operation, the following pressure conditions prevail on the exhaust sides of the respective ones of the compressor units:

1. compressor unit 201: p(1)=1.9 bar
2. compressor unit 202: p(2)=4.5 bar
3. compressor unit 203: p(3)=9 bar.

Accordingly, at load operation of the multistage compressor, all of the reservoirs 601 through 603 are subjected to a pressure p(1), p(2) and p(3) above atmospheric p(air). As a result thereof, at load, the condensate can be drained from the reservoirs 601 through 603 by means of conventional condensate drain devices 2 without the least problem.

At standstill of the multistage compressor unit, the entire compressor unit is vented with atmospheric pressure p(air) from the exhaust side of the third compressor stage 103. As a result thereof, all the parts of the plant i.e., the reservoirs 601 through 603 and the respective ones of the condensate drain devices 2 as well, are subjected to atmospheric pressure p(air). In this case, the condensate can no longer be drained by means of a condensate drain device disclosed in EP 391 250 since these devices require a certain excess pressure in the reservoir.

In the idle mode described above, the locking device 4 is closed completely (or partially) and the sealing device 3 is closed except for a small cross section. The pressure relief 5 is opened, said pressure relief being connected, on its exhaust side, with the intake side of the first compressor stage 101. If this operating condition is maintained for several minutes, new pressures p(1), p(2) and p(3) develop on the exhaust sides of the compressor units 201 through 203:

1. compressor unit 201: p(1)=0.7 bar 2. compressor unit 202: p(2)=1.5 bar 3. compressor unit 203: p(3)=2.1 bar.

Since the reservoirs 602 and 603 of the second and third compressor stages 102 and 103 are subjected to pressures above atmospheric, the condensate produced can still be discharged from the reservoirs 602 and 603 by means of conventional condensate drain devices 2. However, the reservoir 601 of the first compressor unit 101 is subjected to a pressure p(1) below atmospheric. Now if the exhaust valve 24 of the condensate drain device 2 of the first compressor stage 101 were opened as soon as a maximum fill level is reached or exceeded as this would be the case with a conventional condensate drain device, no condensate would be discharged from the reservoir 601. Ambient air would instead penetrate through the exhaust valve 24 of the corresponding condensate drain device 2 into the reservoir 601 and via the drain pipe 501 into the first compressor stage 101, more specifically possibly into the compressor unit 201 as well. This would involve the risk that condensate contained in the reservoir 601 be entrained into the compressor stage 101. This could cause serious malfunctions and damages in the first compressor stage 101.

In order to reliably prevent condensate from being drained from the reservoir 601 of the first compressor stage 101 when the multistage compressor is placed in idle mode, a check valve 7 is provided on the exhaust side of the condensate drain device 2 of the first compressor stage 101, which makes it impossible for the condensate to be discharged from a reservoir 601 subjected to negative pressure. But in principle, condensate can no longer be drained from the reservoir 601. This even applies to a certain excess pressure in the reservoir since the check valve 7 needs, for its function, an additional force e.g., a spring force acting on the sealing device.

FIG. 2 illustrates a first exemplary embodiment of a condensate drain device in accordance with the invention. At the end of the drain pipe 501 in the first compressor stage 101 there is configured a reservoir 601. Said reservoir 601 can be a specially configured reservoir that may be part of the compressed gas system. It is furthermore also possible to use the volume of the very drain pipe 501 as a reservoir 601. Finally, the reservoir 601 can also be part of the very condensate drain device 2. Here, all the prior art embodiments are conceivable. A level meter 21 for acquiring the fill level of condensate in reservoir 601 is arranged in said reservoir 601. The level meter 21 is more particularly intended to acquire the reaching or exceeding of a maximally admissible fill level in the reservoir 601. An electronics unit 26 interpreting the fill level of condensate in the reservoir 601 which has been acquired by the level meter 21 is electrically connected to said level meter 21.

An exhaust valve 24 allowing, in its opened condition, the condensate to be discharged from the reservoir 601 is provided in the bottom portion of the reservoir 601. The exhaust valve 24 is provided with a control conduit input 241 which is connected, via a control conduit 23 for a pressure p(control), to the exhaust side of the second compressor unit 202 so that the outlet pressure p(2) of the second compressor stage is allowed to escape said second compressor unit. A control valve 22 driven by the electronics unit 26 is arranged in the control conduit 23.

Furthermore, a venting valve 25 is arranged in the control conduit 23 between the control valve 22 and the control conduit input 241 of the exhaust valve 24. Said venting valve 25 is driven in such a manner that it vents to the atmosphere the portion of the control conduit 23 which is located between control valve 22 and exhaust valve 24 when control valve 22 blocks the flow through control conduit 23. This can be realized by a corresponding connection with the control valve 22 on the one side or by a corresponding drive by means of the electronics unit 26 on the other. More specifically, the control valve 22 can be configured in such a manner that it also performs the function of the venting valve 25. This can be realized in having the control valve configured as a 3/2 way valve for example.

The control valve 22 is preferably designed as a servo valve that is magnetically actuated. A large cross-section can thus be varied with small control forces.

The exhaust valve 24 is built in such a manner that it is driven by the pressure prevailing at the control conduit input 241, by the pressure prevailing at its inlet, which is connected to the outlet of the reservoir 601, and by an additional, preferably mechanically operating force K. More specifically, the exhaust valve 24 can be configured as a diaphragm valve according to the diaphragm valve described in EP 391 250. The additional operating force K corresponds to the threshold value P of the method claim and of the apparatus claim.

The exhaust valve 24 is thereby configured in such a manner that the exhaust valve 24 is locked when the pressure prevailing in the reservoir 601 p(reservoir)+threshold value P is lower than the pressure p(input) prevailing at the control conduit input 241 so that in this case no condensate is allowed to be drained.

If, by contrast, the pressure prevailing in the reservoir 601 p(reservoir)+threshold value P is higher than the pressure p(input) prevailing at the control conduit input 241, the exhaust valve 24 opens the outlet of the reservoir 601 so that the condensate contained in the reservoir is allowed to discharge.

The electronics unit 26 is adapted to interpret the fill level of condensate in the reservoir 601 that has been acquired by the level meter 21. More specifically, the electronics unit 26 is adapted to drive the control valve 22 in such a manner that, when the fill level of condensate in the reservoir 601 is below the maximally admissible fill level, the control valve 22 is open so that the pressure p(2) of the exhaust side of the second compressor unit 202 prevails in the entire control conduit 23 and more specifically at the control conduit input 241 of the exhaust valve 24.

The threshold value P is preferably realized by a spring provided in the exhaust valve 24. The threshold value P is set in such a manner that, under any operating conditions (load operation, idle mode) of the multistage compressor, the following always applies:

p(reservoir)+P<p(control), and p(reservoir)+P<p(air), when p(reservoir)≦p(negative), preferably p(reservoir)<p(air), or p(reservoir)+P>p(air), when p(reservoir)≧p(air), more specifically p(reservoir)=p(excess).

Furthermore, the control pressure p(control) can also be selected to match a predetermined threshold value P. In this embodiment, the control pressure p(control) can be withdrawn from the exhaust side of a suited compressor stage (1.*j*); the following must not apply:

$$j=i+1$$

Under the second condition ($2^{nd}$ variant), the threshold value P i.e., in this case the spring 242, keeps the exhaust valve 24 open when atmospheric pressure prevails in all parts of the exhaust valve 24.

That is to say that, when control pressure p(control) prevails at the control conduit input 241 of exhaust valve 24, the exhaust valve 24 is always closed.

If, by contrast, atmospheric pressure p(air) prevails at the control conduit input 241, the exhaust valve 24 is either open, when the reservoir 601 is subjected to a pressure p(reservoir) that corresponds to the atmospheric pressure p(air) or to the equilibrium pressure p(excess) at load operation, or closed when the reservoir 601 is subjected to a pressure p(reservoir) that corresponds to the equilibrium pressure p(negative) in the idle mode.

With respect to this particular embodiment, this means:

If the fill level of condensate in the reservoir 601 is lower than the maximally admissible fill level, the control pressure p(control) prevails at the control conduit input 241 of the exhaust valve 24, said control pressure being substantially given by the pressure p(2) on the exhaust side of the compressor unit 202 of the second compressor stage 102. On the other hand, the gas pressure p(reservoir) prevails in the reservoir 601 on the inlet side of the exhaust valve 24, said gas pressure substantially corresponding to the gas pressure p(1) on the exhaust side of the first compressor stage 201. The control pressure $$p(input)=p(control)=p(2)\approx p(air)$$

prevails at the control conduit input 241. In selecting the threshold value P in the way described herein above, it is made certain that the following always applies under any operating conditions of the multistage compressor:

$$p(reservoir)+P<p(control),$$

by operating conditions being meant the idle mode and load operation, not however the condition in which the multistage compressor is switched to an OFF condition. Accordingly, the exhaust valve 24 remains closed until the fill level of the condensate in the reservoir 601 reaches the maximally admissible level.

Once the highest admissible fill level of condensate in the reservoir 601 is reached, this condition being recorded by the level meter 21, the electronics unit 26 generates a control signal for closing the control valve 22. Concurrently, the portion of the control conduit 23 which is connected between the control valve 22 and the exhaust valve 24 is vented to atmospheric pressure p(air) via the venting valve 25. Accordingly, atmospheric pressure p(air) prevails at the control conduit input 241 of the exhaust valve 24.

At load operation of the multistage compressor the pressure p(reservoir) prevailing in the reservoir 601 is above atmospheric. Accordingly, the following always applies:

$$p(reservoir)+P>p(input)=p(air),$$

since $$p(1)>p(air).$$

Accordingly, at load operation of the multistage compressor, the exhaust valve 24 opens the outlet of the reservoir 601 as soon as a maximally admissible fill level is reached or exceeded in the reservoir 601 so that condensate can be discharged therefrom.

If the complete compressed gas plant is switched off, all the parts of the plant are at atmospheric pressure p(air), the reservoir 601 in particular. Atmospheric pressure also prevails at the control conduit input 241 of the exhaust valve 24. Therefore, in this case again, the following applies:

$$p(reservoir)+P>p(input)=p(air),$$

since $$p(reservoir)=p(air),$$

so that the exhaust valve 24 is always open for the draining of condensate.

If, by contrast, the multistage compressor is in the idle mode, the reservoir 601 is subjected to a pressure p(reservoir) below atmospheric pressure p(air), more specifically to a pressure p(negative). In this case, the following applies:

$$p(reservoir)+P<p(input)=p(air),$$

since $$p(reservoir)=p(1)<p(air) \text{ and P is selected accordingly}.$$

The exhaust valve 24 remains closed as a result thereof.

If the reservoir 601 is subjected to the negative pressure p(negative), the described device of the invention can reliably prevent the exhaust valve 24 from being opened. Surrounding air is thus reliably prevented from penetrating through the condensate drain device 6 located at the outlet of the reservoir 601 into the reservoir 601 and the connected first compressor stage 101, more specifically the first compressor unit 201. As a result thereof, no condensate contained in the reservoir 601 is allowed to penetrate the first compressor stage or possibly even the second compressor stage 102. The multistage gas compressor is thus reliably safe under any operating conditions.

The described exemplary embodiment of the device in accordance with the invention thus performs the individual steps of the method of the invention. Under the various operating conditions of the multistage compressor, condensate produced at the trap 401 accumulates in the reservoir 601. The fill level of the condensate in the reservoir 601 is acquired by means of the level meter 21. The fill level acquired by the level meter 21 is interpreted by the electronics unit 26. A control pressure p(control) is provided via the control conduit 23, said control pressure substantially corresponding to the pressure p(2) on the exhaust side of the second compressor stage 102. Accordingly, the control pressure p(control) is always above the pressure in the reservoir p(reservoir). When the compressed gas system is in operation, the control pressure p(control) is always above atmospheric. The electronics unit 26 provides, at the control conduit input 241 of the exhaust valve 24, a pressure p(input) which i) substantially corresponds to the control pressure p(control), (here, the control pressure equals the pressure p(2) on the exhaust side of the second compressor stage 102) when the maximum fill level in the reservoir 601 has not yet been reached or exceeded, or ii) substantially corresponds to atmospheric pressure p(air) when the maximum fill level in the reservoir 601 is reached or exceeded.

The position of the exhaust valve 24 which is assigned to the reservoir 601 and is provided for discharging condensate from the reservoir 601, is controlled by the pressure p(reservoir) in the reservoir 601, by the pressure p(input) at the control conduit input 241, by the pressure on the exhaust side of the exhaust valve 24 which i.a. amounts to atmospheric pressure, and by a threshold value. The exhaust valve for draining the condensate is thereby iii) closed when (as long as) the pressure p(input) is above the pressure p(reservoir) in the reservoir 601 plus the threshold value P, the threshold value being realized by the spring 242 in the exhaust valve, i.e.

$$p(reservoir)+P<p(input)$$

and:

iv) open when the pressure p(input) at the control conduit input 241 is below the pressure p(reservoir) in the reservoir 601 plus the threshold value P i.e., $$p(reservoir)+P>p(input)$$

More specifically, the method in accordance with the invention is carried out by the condensate drain device according to the exemplary embodiment in such a manner that the threshold value P, which is preferably realized by a spring 242 in the exhaust valve 24, is selected in such a manner that, under any operating conditions (as mentioned herein above) of the multistage compressor, the following applies:

$$p(reservoir)+P<p(control),$$

and $$p(reservoir)+P<p(air), \text{ when } p(reservoir)=p(negative) \text{ or } p(reservoir)+P>p(air), \text{ when } p(reservoir)=p(excess).$$

As an additional precaution, there may be provided that the electronics unit 26 senses a change in the operating condition from load operation to idle and reverse. In case of such a change in the operating condition, the pressure in the reservoir changes from an equilibrium value, e.g., p(excess), into another, e.g., p(negative). In certain cases, pressures may develop in the reservoir 601 at which the method of the invention and the condensate drain device of the invention can prevent the exhaust valve 24 from opening although the reservoir 601 is subjected to a negative pressure. To avoid this, there may be provided that, even when the maximum fill level of condensate in the reservoir 601 is reached, the electronics unit 26 does not close the control valve 22 until the equilibrium pressures p(excess) or p(negative) respectively are substantially achieved.

This can more particularly be realized in acquiring the effective pressure in the reservoir 601 by means of an additional pressure sensor. More specifically, the electronics unit 26 is configured in such a manner that the control valve 22 is only actuated when the reservoir is subjected to a pressure that guarantees safe functioning of the method of the invention.

As an alternative, said control can also be realized by means of a time circuit. The time constants are thereby preferably selected to match the technical data of the multistage compressor.

In an advantageous development of the method in accordance with the invention, the electronics unit 26 has been developed to acquire the operating condition of the multistage compressor when the maximum fill level of condensate in the reservoir 601 is reached so that the condensate would in principle have to be drained from the reservoir 601. On account of the described embodiment of the device according to the invention, this however is not possible as the reservoir 601 is subjected to a negative pressure, more specifically to p(negative). In order to avoid the occurrence of a critical operating condition of the multistage compressor, the electronics unit 26 is configured to generate an error message in this case. This error message may for example be used to switch off the multistage compressor or to restore load operation so that at least atmospheric pressure p(air) or a pressure above atmospheric develops in the reservoir 601. As a result thereof, the condensate can reliably be discharged from the reservoir 601.

In most applications and in the idle mode of the compressor, but little condensate is generated at the trap 401 of the first compressor stage so that the heretofore described embodiment constitutes a reliable solution. For this reason, the problematic case described in which, in the idle mode, so much condensate accumulates in the reservoir that the maximally admissible fill level is exceeded, is quite unlikely. This can be utilized to readily generate another error alarm indicating an unexpected production of condensate or of another fluid, like e.g., cooling water, in the reservoir 601. The pressure p(reservoir) is acquired by means of a level meter arranged in the reservoir. If the reservoir is subjected to a negative pressure p(negative), which is an indicator for the idle mode of the multistage compressor, and if, concurrently, the level meter 21 signalizes that the maximally admissible fill level in the reservoir is reached or exceeded, the suitably developed electronics unit 26 delivers an alarm message. As in the idle mode but little condensate should be produced in the reservoir 601, the presence of a large quantity of fluid in the reservoir 601 can be considered a failure in the multistage compressor, a cooling water leakage for example. This method can still be optimised when the volume of the reservoir 601 is chosen to suffice in almost every case for collecting the small amount of condensate that can be maximally produced in the idle mode of the multistage compressor. The required dimensions can be evaluated in computing said amount of condensate from the circulating volume of compressed gas.

Furthermore, an alarm message can be generated when, after the maximally admissible fill level in the reservoir 601 has been reached or exceeded, the control valve 22 is driven in the manner described and the maximum fill level does not sink again within a predetermined period of time. This also indicates an error in the multistage compressor, like for example the clogged condition of the exhaust valve 24 and of the draining regions connected thereto or the presence of a great quantity of cooling water. Since, in accordance with the invention, the exhaust valve does not open when the reservoir is subjected to the negative pressure p(negative), the failure message can be suppressed when the pressure gauge arranged in the reservoir signalizes a negative pressure in the reservoir 601.

If however, in particular cases of application and in the idle mode of a multistage compressor, a large quantity of condensate is produced at the trap 401 of the first compressor stage or of the subsequent compressor stages, the method of the invention and the device of the invention can be readily developed so that, even in the idle mode, the condensate may reliably be discharged from the reservoir 601 of the first compressor stage or from the reservoirs of the subsequent compressor stages. For this purpose, the method of the invention is developed in such a manner that, when the maximally admissible fill level in the reservoir 601, which is subjected to a pressure p(reservoir) below atmospheric, is reached or exceeded, the flow of condensate toward the reservoir 601 via the drain pipe 501 is blocked in such a manner that it is gastight. Simultaneously, the reservoir is put under a pressure which at least equals atmospheric pressure or corresponds to an excess pressure above atmospheric.

Accordingly, in the idle mode of the multistage compressor as well, a pressure p(reservoir) prevails in the reservoir 601 that at least equals atmospheric pressure. In cooperation with the method recited in the main claim, the condensate contained in the reservoir 601 can be discharged without any problem even in the idle mode of the multistage compressor. Additionally, said method and the device described herein after can also advantageously be utilized together with conventional condensate drain devices for draining condensate from a reservoir subjected to a negative pressure.

The development required for this purpose is shown in FIG. 3. A servo conduit 94, which branches off the control conduit 23 between the control valve 22 and the exhaust side of the compressor unit 202 of the second compressor stage 102, leads to the servo conduit input 911 of a feed stop 91 arranged in the drain pipe 501 upstream of the reservoir 601. Said feed stop 91 blocks the flow of condensate through drain pipe 501 into the reservoir 601 when a servo pressure p(servo) prevails at the servo conduit input 911. Generally speaking, the servo pressure used is at least atmospheric pressure, preferably an excess pressure though. In this exemplary embodiment, the pressure p(2) on the exhaust side of the second compressor unit 202 is used as a servo pressure p(servo).

A differential pressure stop 93 is arranged in the servo conduit 94 between the branching of the control conduit 23 and the feed stop 91. Said differential pressure stop 93 is provided with a control conduit input 931 and is designed in such a manner that it locks the servo conduit 94 in case a negative pressure below atmospheric, more specifically p(negative), prevails at the control conduit input 931 which is connected to the gas space of the reservoir 601 via a second control conduit 96.

A branching in the servo line 94 is provided between the differential pressure stop 93 and the feed stop 91. A venting conduit 95 leads from this branching toward the gas space of the reservoir 601 via said venting conduit 95, the reservoir 601 can be put under servo pressure p(servo), which, here, amounts to at least atmospheric pressure p(air) by its structure alone.

Furthermore, a servo valve 92, which is driven by the electronics unit 26, is arranged in the servo conduit 94 between the differential pressure stop 93 and the branch of the control conduit 23. The drive of the control electronics 26 is configured in such a manner that the servo valve 92 blocks the flow of the servo pressure p(servo) through the servo conduit 94 toward the differential pressure stop 93 when the maximum fill level of condensate in the reservoir 601 is not (yet) reached. Concurrently, the portion of the servo conduit 94 that is located between said valve and the differential pressure stop 93 is vented by the servo valve 92 to atmospheric pressure. Preferably, the servo valve 92 is again configured as a 3/2 way valve. As a result thereof, there is no servo pressure prevailing at the differential pressure stop 93 and, accordingly, no servo pressure prevailing at the feed stop 91 either. That is to say that, when the maximum fill level of condensate in the reservoir 601 is not (yet) reached or exceeded, the feed stop 91 remains open and the reservoir 601 is not vented with the servo pressure p(servo) [=p(2)] via the venting conduit 95.

If, by contrast, the maximum fill level is reached, the servo valve 92 opens the flow of servo pressure p(servo) toward the differential pressure stop 93 under the drive of the electronics unit 26.

If the reservoir 601 is subjected to an excess pressure, more specifically to the pressure p(excess), the differential pressure stop 93 remains closed to the flow of the servo pressure p(servo) toward the feed stop 91 via the servo conduit 94 and toward the gas space of the reservoir 601 via the venting conduit 95. As a result thereof, the feed stop 91 remains open, condensate is still allowed to flow through the drain pipe 501 into the reservoir 601, the reservoir 601 remaining subjected to a pressure substantially corresponding to the pressure on the exhaust side of the first compressor unit 201.

If, by contrast, the reservoir 601 is subjected to a negative pressure, more specifically to the pressure p(negative), the differential pressure stop 93 opens the flow of the servo pressure p(servo) toward the feed stop 91 via the servo conduit 94 and toward the gas space of the reservoir 601 via the venting conduit 95. As a result thereof, the feed stop 91 is closed, condensate is no longer allowed to flow into the reservoir 601 via the drain pipe 501. The reservoir 601 is vented via the venting conduit 95 with the servo pressure p(servo) which substantially corresponds to the pressure on the exhaust side of the second compressor unit 201. In designing accordingly the cross sections of the valves and conduits, a fast rise in pressure in the reservoir 601, to at least atmospheric pressure p(air), but more specifically to the pressure p(2) on the exhaust side of the second compressor unit 202 can be realized. As explained herein above, this makes it readily possible to discharge condensate from the reservoir 601 by means of the method of the invention and the condensate drain device of the invention.

The drive of the servo valve 92 by the electronics unit 26 is preferably developed in such a manner that, when the maximally admissible fill level in the reservoir 601 is reached or exceeded, the flow of the servo pressure p(servo) toward the differential pressure stop 93 remains open until the accumulated condensate is completely drained from the reservoir 601. For this purpose, all of the prior art methods used in connection with sensor controlled condensate drain devices like for example acquiring a lower fill level, time switch, and so on, can be made use of advantageously.

What is claimed is:

1. A method for draining condensate from a reservoir of any configuration in which condensate produced in a compressed air or compressed gas system is collected, said reservoir connected for this purpose by way of a drain pipe for condensate, to a trap of the compressed gas system, the reservoir being put under a gas pressure p(reservoir) that may be, depending on the operating condition of the compressed gas system, a negative pressure p(negative) below atmospheric pressure p(air), an excess pressure p(excess) above atmospheric pressure p(air) or at atmospheric pressure p(air), the method comprising the following steps:

a) collecting condensate in the reservoir;
   b) acquiring the fill level of condensate in the reservoir by means of a level meter and an electronics unit;
   c) providing a control pressure p(control) which, in any operating conditions of the compressed gas system, is above the pressure p(reservoir) in the reservoir and above atmospheric pressure p(air);
   d) providing, under the control of the electronics unit, a control conduit input of an exhaust valve which is assigned to the reservoir and is intended to drain the condensate collected in the reservoir with a pressure p(input), the pressure p(input)
   i) substantially corresponding to the control pressure p(control) when the maximum fill level in the reservoir has not yet been reached or has been exceeded, ii) substantially corresponding to the atmospheric pressure p(air) when the maximum fill level in the reservoir is reached or exceeded, and wherein the position of the exhaust valve is controlled by the pressure p(reservoir) in the reservoir, the pressure p(input) at the control conduit input, the pressure on the exhaust side of the exhaust valve which can be atmospheric pressure p(air), and by a threshold value P, wherein the exhaust valve for draining the condensate
   iii) is closed when the pressure p(input) is above the pressure p(reservoir) in the reservoir plus the threshold value P, and
   iv) is opened when the pressure p(input) is below the pressure p(reservoir) in the reservoir plus the threshold value P.

2. The method of draining condensate according to claim 1, wherein the threshold value P is selected in such a manner that in any operating conditions (not in an OFF condition) of the compressed gas system at least one of the following applies:
  a) p(reservoir)+P−p(input), when p(input)=p(control); and
  b)
    i) p(reservoir)+P>p(control), when p(input)=p(air) and p(reservoir)÷p(air), such that p(reservoir)=p(excess) or
    ii) p(reservoir)+P<p(control) when p(input)=p(air) and p(reservoir)=p(negative), such that p(reservoir)<p(air).

3. The method according to claim 1, wherein, when the maximum fill level of condensate in the reservoir is reached or exceeded, atmospheric pressure p(air) prevails for a period of time T at the control conduit input of the reservoir, T being calculated in such a manner that at least a majority of the condensate collected in the reservoir is allowed to discharge through the exhaust valve.

4. The method according to claim 1, wherein the compressed gas system is a multistage compressor for compressing a gas, which is provided with compressor stages connected in series, the $i^{th}$ compressor stage having a compressor unit and an aftercooler with a trap arranged downstream thereof, which is connected, via a drain pipe for condensate, to a reservoir of any configuration and put under a gas pressure p(reservoir) that substantially corresponds to the gas pressure p(i) on the exhaust side of the compressor stage and wherein the control pressure p(control) substantially corresponds to the pressure p(j) on the exhaust side of the $j^{th}$ compressor stage, the $j^{th}$ compressor stage producing on the exhaust side thereof, in operation, a gas pressure p(j) which is higher than the gas pressure p(i) on the exhaust side of the compressor stage.

5. A condensate drain device for draining condensate from a reservoir in which condensate produced in a compressed gas system is collected, the reservoir being put under a gas pressure p(reservoir) that, depending on the operating condition of the compressed gas system, is at a negative pressure below atmospheric pressure p(air) at an excess pressure p(excess) above atmospheric pressure p(air) or at atmospheric pressure p(air), the condensate drain device comprising:
  a) a level meter for acquiring the condition in which the maximum fill level in the reservoir has been reached or exceeded;
  b) a control valve arranged in a control conduit via which a control pressure p(control) is delivered to the condensate drain device, the control pressure being above the pressure in the reservoir p(reservoir) under any operating conditions of the compressed gas system such that p(control)>p(reservoir), and p(control) >atmospheric pressure p(air), said control valve provided for controlling the flow of the control pressure p(control) through said control conduit;
  c) an exhaust valve assigned to the reservoir and provided for discharging condensate from the reservoir against atmospheric pressure p(air), said exhaust valve provided with a control conduit input which is connected to said control conduit by way of said control valve so that, when said control valve is open, the control pressure p(control) substantially prevails at said control conduit input;
  d) a venting valve arranged in said control conduit between said control valve and said control conduit input and which, when said control valve is closed, vents said control conduit between said control valve and said control conduit input;
  e) an electronics unit that interprets the signal of said level meter arid closes said control valve when the maximum fill level in the reservoir has been reached or exceeded;
said exhaust valve provided with the following positions of control:
   i) a locking position for condensate when the pressure p(input) prevailing at said control conduit input is higher than the pressure prevailing in the reservoir p(reservoir) plus a preset threshold value P, and
   ii) a flow through position for condensate when the pressure prevailing at said control conduit input p(input) is lower than the pressure prevailing in the reservoir p(reservoir) plus threshold value P.

6. The condensate drain device according to claim 5, wherein the threshold value P is selected to match the pressures p(reservoir), p(control) and p(air) so that, in any operating conditions of the compressed gas system, the following applies:
  a) p(reservoir)+P<p(input), when p(input)=p(control)
  b) p(reservoir)+P>p(control), when p(input)=p(air).

7. The condensate drain device according to claim 5, wherein the threshold value P is realized by way of a spring in the exhaust valve.

8. The condensate drain device according to claim 7, wherein the threshold value P at the exhaust valve is settable by varying the force of the spring or its biasing force.

9. The condensate drain device according to claim 5, wherein the exhaust valve is configured as a pilot operated diaphragm valve.

10. The condensate drain device according to claim 9, wherein the diaphragm valve is driven by the pressure p(input) at the control conduit input, by the pressure p(reservoir) in the reservoir, by the pressure on the exhaust side of the exhaust valve which can be atmospheric pressure p(air) and by an additional force K that corresponds to the threshold value P.

11. The condensate drain device according to claim 5, wherein the venting valve is incorporated in the control valve.

12. The condensate drain device according to claim 11, wherein the venting valve is configured as a 3/2 way valve.

13. The condensate drain device according to claim 5, wherein the level meter is a capacitive or a float actuated level meter.

14. The condensate drain device according to claim 5, wherein the reservoir is integrated in the condensate drain device or wherein the condensate drain device is provided with an additional reservoir of its own.

15. The condensate drain device according to claim 5, wherein the compressed gas system is a multistage compressor for compressing a gas, that is provided with compressor stages connected in series, the $i^{th}$ compressor stage having a compressor unit and an aftercooler with a trap arranged downstream thereof, the condensate drain device being provided for draining condensate from the reservoir of any configuration of the $i^{th}$ compressor stage, said reservoir being connected to the trap via a drain pipe for condensate and being put under a gas pressure p(reservoir) that substantially corresponds to the gas pressure p(i) on the exhaust side of the compressor stage, and wherein the control pressure p(control) used is the pressure p(j) on the exhaust side of the compressor stage, the compressor stage producing, in operation, on the exhaust side a gas pressure p(j) that is higher than the gas pressure p(i) on the exhaust side of the compressor stage.

* * * * *